United States Patent
Karkkainen et al.

(10) Patent No.: US 9,232,228 B2
(45) Date of Patent: Jan. 5, 2016

(54) PROCESSING OF IMAGE

(75) Inventors: Tuomas Karkkainen, Turku (FI); Ossi Kalevo, Toijala (FI)

(73) Assignee: GURULOGIC MICROSYSTEMS OY, Turku (FI)

( * ) Notice: Subject to any disclaimer, the term of this patent is extended or adjusted under 35 U.S.C. 154(b) by 919 days.

(21) Appl. No.: 13/461,029

(22) Filed: May 1, 2012

(65) Prior Publication Data

US 2012/0219065 A1  Aug. 30, 2012

Related U.S. Application Data

(63) Continuation-in-part of application No. 13/430,821, filed on Mar. 27, 2012, and a continuation-in-part of application No. 11/660,037, filed on Feb. 12, 2007, now Pat. No. 8,169,547, said application No.

(Continued)

(30) Foreign Application Priority Data

Aug. 12, 2004  (FI) ...................................... 20045290

(51) Int. Cl.
  *H04N 5/14*    (2006.01)
  *H04N 9/64*    (2006.01)
  (Continued)

(52) U.S. Cl.
  CPC ........... *H04N 19/507* (2014.11); *H04N 19/132* (2014.11); *H04N 19/137* (2014.11); *H04N 19/176* (2014.11); *H04N 19/186* (2014.11); *H04N 19/85* (2014.11)

(58) Field of Classification Search
  CPC ... H04N 19/85; H04N 19/132; H04N 19/186; H04N 19/51
  See application file for complete search history.

(56) References Cited

U.S. PATENT DOCUMENTS 4,553,171 A  11/1985  Holladay et al.
4,717,957 A   1/1988  Santamaki et al.
(Continued)

FOREIGN PATENT DOCUMENTS

EP  0518464 A2  12/1992
EP  0 551 990 A1   7/1993
(Continued)

OTHER PUBLICATIONS

Communication dated Jul. 10, 2014 issued by the European Patent Office in related European Patent Application No. 12173534.4-1908 (3 pages).

(Continued)

*Primary Examiner* — Nhon Diep
(74) *Attorney, Agent, or Firm* — Robert P. Michal, Esq.; Carter, DeLuca, Farrell & Schmidt, LLP

(57) ABSTRACT

The present invention relates to an image processor that is configured to compare a single frame included in the received signal with a preceding processed frame so as to detect changes. In order to enable the image being compressed in as compact a format as possible, the processor is configured to detect changes by dividing the pixels of a single frame into movement blocks and to detect the movement block as changed if in said movement block there is a given number of pixels whose color value change as compared with the corresponding pixels of the preceding processed frame exceeds a predetermined threshold, to exchange the color values of the pixels of the unchanged movement blocks in the frame under process for predetermined values and to generate a signal that indicates the changes.

17 Claims, 3 Drawing Sheets

Related U.S. Application Data

13/430,821 is a continuation of application No. 11/660,037, filed as application No. PCT/FI2005/050289 on Aug. 9, 2005, now Pat. No. 8,169,547.

(51) Int. Cl.
| | |
|---|---|
| *H04N 19/507* | (2014.01) |
| *H04N 19/176* | (2014.01) |
| *H04N 19/132* | (2014.01) |
| *H04N 19/137* | (2014.01) |
| *H04N 19/186* | (2014.01) |
| *H04N 19/85* | (2014.01) |

(56) References Cited

U.S. PATENT DOCUMENTS

| | | | |
|---|---|---|---|
| 5,377,018 | A | 12/1994 | Rafferty |
| 5,983,251 | A | 11/1999 | Martens et al. |
| 6,049,629 | A | 4/2000 | Hirabayashi et al. |
| 6,160,848 | A | 12/2000 | Sivan et al. |
| 6,275,527 | B1 | 8/2001 | Bist et al. |
| 6,373,890 | B1 | 4/2002 | Freeman |
| 7,865,015 | B2 * | 1/2011 | Chen et al. .................... 382/173 |
| 2002/0048398 | A1 | 4/2002 | Bokhour |
| 2003/0091238 | A1 | 5/2003 | Plaza |
| 2003/0165273 | A1 | 9/2003 | Berkner et al. |
| 2005/0013466 | A1 | 1/2005 | Beun |
| 2006/0013495 | A1 * | 1/2006 | Duan et al. ................... 382/235 |
| 2006/0215943 | A1 | 9/2006 | Agari et al. |
| 2007/0195993 | A1 * | 8/2007 | Chen et al. .................... 382/103 |
| 2010/0231599 | A1 | 9/2010 | Tung et al. |
| 2012/0219065 | A1 | 8/2012 | Karkkainen et al. |

FOREIGN PATENT DOCUMENTS

| | | | |
|---|---|---|---|
| EP | 0899959 | A2 | 3/1999 |
| WO | WO 86/03922 | A1 | 7/1986 |
| WO | WO 01/57803 | A1 | 8/2001 |
| WO | WO 2006/016007 | A1 | 2/2006 |

OTHER PUBLICATIONS

Hein, David, et al., "Video Compression Using Conditional Replenishment and Motion Prediction," IEEE Transactions on Electromagnetic Compatibility, IEEE Service Center, New York, NY, vol. EMC-10, No. 3, Aug. 1, 1984, pp. 134-142, XP011165174.

Sivan, Zohar, et al., "Change Detector for Image Sequence Coding," Proceedings of the Picture Coding Symposium (PCS), Lausanne, Mar. 17-19, 1993, pp. 14.1A-14.1/B, XP000346481.

Zhao Y. et al., "Macroblock skip-mode prediction for complexity control of video encoders," International Conference on Visual Information Engineering, Jul. 7, 2003, pp. 5-8, XP002542234.

http://www.newmediarepublic.com/dvideo/compressions/adv07.html, publ. Feb. 14, 2004 (Wayback archive), chapter, "Block Based Difference Coding".

Summons to attend oral proceedings pursuant to Rule 115(1) EPC which was issued by the European Patent Office on Dec. 12, 2013 in related European Patent Application No. 12 173 534.4 (4 pages).

Communication under Rule 71(3) EPC which was issued by the European Patent Office on Oct. 2, 2014 in related European Patent Application No. 12 173 534.4-1908 ( 33 pages).

Communication (Extended European Search Report) dated Nov. 29, 2012 issued from the European Patent Office in related European Application No. 12 173 534.4 (4 pages).

Communication (Communication pursuant to Article 94(3) EPC dated Jun. 17, 2013 issued from the European Patent Office in related European Application No. 12 173 534.4 (4 pages).

Communication (Communication pursuant to Article 94(3) EPC) dated May 15, 2015 issued from the European Patent Office in relation to European Patent Application No. 13172237.3 (7 pages).

Written Opinion of the International Preliminary Examining Authority, International Application No. PCT/FI2014/050479 dated Jun. 24, 2015 (10 pages).

Office Action issued in U.S. Appl. No. 13/430,821 dated Aug. 12, 2015 (7 pages).

* cited by examiner

PROCESSING OF IMAGE

CROSS REFERENCE TO RELATED APPLICATIONS

This is a continuation-in-part of U.S. application Ser. No. 13/430,821 filed Mar. 27, 2012, which is a continuation of U.S. application Ser. No. 11/660,037 filed Feb. 12, 2007, which in turn claims priority of PCT international application No. PCT/FI2005/050289 filed Aug. 9, 2005 and Finnish application No. 20045290 filed Aug. 12, 2004, and this is also a continuation-in-part of U.S. application Ser. No. 11/660, 037 filed Feb. 12, 2007, which in turn claims priority of PCT international application No. PCT/FI2005/050289 filed Aug. 9, 2005 and Finnish application No. 20045290 filed Aug. 12, 2004, the entire disclosure of each of which is incorporated herein by reference.

FIELD OF THE INVENTION

The present invention relates to processing of an image such that after compressing, the amount of image data to be stored on a storage medium, or alternatively the amount of data to be further transmitted over a communications network, can be minimized.

DESCRIPTION OF THE PRIOR ART

Previously there are known image/video coders, such as DivX, MPEG4, JPEG, JPEG2000, etc., which are able to compress an image such that the file size is considerably reduced as compared with what the file size would be if the image had been stored directly in the format received from a camera, video camera, scanner, screen, file or any other image source. For instance, the MPEG compression utilizes a solution in which all image frames are not directly forwarded from the coder as image frames, but only in given situations a single image frame is forwarded from the coder. Frames subsequent to the image frame are not forwarded, but only the changed frame parts are retrieved and they are forwarded from the coder. In this way there will be no need to continuously send information regarding a portion of the image which remains unchanged. In connection with reproduction, a single frame is displayed, after which change information collected from subsequent frames is utilized to change the single image frame at the same rate as the original images. Thus, the viewer will see an almost identical image as the one the camera originally shot.

The coders utilizing the above-described known compression algorithms have a drawback. That is, more often than necessary they interpret the image as having changed to the extent that it necessitates transmission of a whole new image frame. Frequent forwarding of a whole frame from the coder leads to a large file size.

For instance, WO 86/03922 teaches that there is also previously known a solution in which memories of an image transmitter and receiver maintain the same earlier-shot reference image and in which, as the image changes, it is first checked to determine whether the changed areas have changed to correspond to the respective blocks in the stored reference image. If they have changed, a code word is sent from the transmitter to the receiver, on the basis of which code word the receiver can retrieve from the reference image in its memory the changed movement blocks. Thereafter, if the changed movement blocks do not correspond to the respective blocks in the reference image, the changed movement blocks are transmitted from the transmitter to the receiver.

The solution known from WO 86/03922 has a drawback, however, in that it works effectively only when the background of the frame remains unchanged. In other words, in practice the camera should stay still. In addition, a solution based on code word transmission is not compatible with known coders, and consequently compression algorithms of the known coders that have been found effective cannot be utilized.

SUMMARY OF THE INVENTION

It is an object of the present invention to solve the above problems associated with the known solutions by providing a solution for processing an image in a novel manner which enables minimization of the amount of data to be forwarded or stored and in connection with which it is possible to use coders utilizing prior art compression algorithms for image compression. Another object of the invention is to provide a solution by which an image processed in accordance with the invention can be reproduced.

In the present invention it has been found that further transmission or storage of whole frames can be avoided completely when only the changed movement blocks are forwarded or stored in the original format. In order for the solution to be effectively utilized in connection with the known coder compression algorithms, the invention always forwards or stores all the movement blocks of the whole frame. The colour values of the pixels in the unchanged movement blocks are changed, however, to correspond to the values of a predetermined colour or characteristic value. With this procedure the prior art coders are able to compress the image into a very compact format. Practice has shown that the resulting file size is reduced to less than one tenth of what it would be without the method of the invention. The most considerable advantage of the solution according to the invention is thus substantial reduction in the size of a file to be stored or the amount of data to be forwarded.

Preferred embodiments of the processor, the reproduction device and the methods of the invention are disclosed herein.

BRIEF DESCRIPTION OF THE DRAWINGS

In the following the invention will be described in greater detail, by way of example, with reference to the accompanying drawings, in which.

DESCRIPTION OF THE PREFERRED EMBODIMENTS

Figure 1:
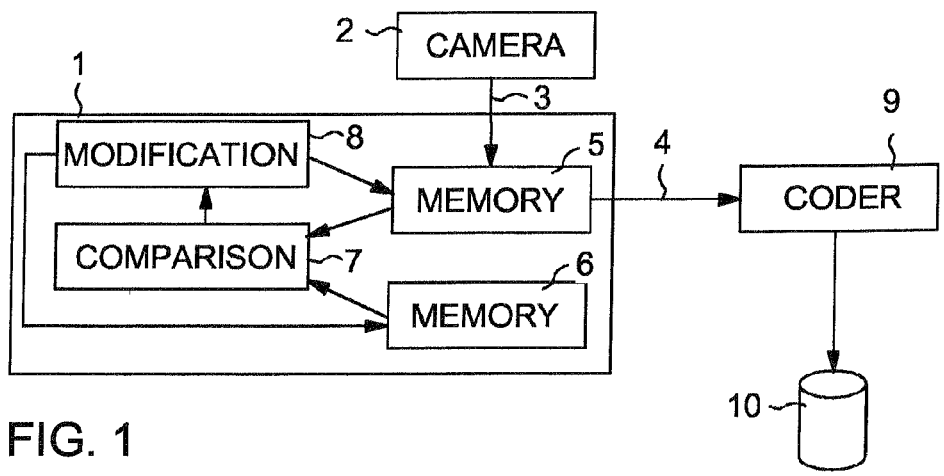
FIG. 1 is a block diagram of a processor in accordance with the invention.

Operations set forth in the blocks of a processor 1 of the block diagram in FIG. 1 can be implemented by software, circuit solutions or combinations thereof. Operationally the blocks can be implemented in the presented manner or alternatively the operations of one or more blocks can be integrated.

In practice the processor 1 can be integrated with the camera with which the image is obtained. This camera may be, for instance, a conventional camera, video camera, a control camera or a mobile station (for example, a mobile phone, computer tablet, etc.) with an integrated camera. It is advantageous that the processor processes the image directly from the camera, i.e., prior to storing it in a file or transmitting it further over a communications network, because in that case it will be possible to minimize the noise appearing in the image at the time of processing. This kind of noise increases the size of the file to be stored or forwarded.

In the exemplary case of FIG. 1 the processor 1 receives a signal 3 produced by a camera. On the basis of the processed signal the processor 1 generates and further supplies a signal 4. The latest frame received from the camera 2, i.e., the frame under process, is stored in a memory 5. A second memory 6 stores the previous processed frame. A comparison block 7 compares the contents of the memories 5 and 6 one movement block at a time and detects the changed movement blocks on the basis of colour changes in the pixels of the movement blocks.

A modification block 8 modifies the frame under process on the basis of the comparison performed by the comparison block 7. Modification is performed on the movement blocks stored in the memory 5 which are unchanged as compared with the frame stored in the memory 6. In the modification the colour values of the unchanged movement block pixels are set to correspond to the values of a specific colour. The colour values of the pixels are advantageously set to define the pixel colour as black.

The modification block 8 also modifies the frame stored in the memory 6. This is done by copying the pixels of all changed movement blocks from the memory 5 and said pixels are stored on the corresponding movement blocks of the frame in the memory 6. Said changed frame in the memory 6 is then used as a reference frame for a subsequent frame to be received from the camera 2 so as to detect changed movement blocks.

The processor 1 utilizes the changed and unchanged movement blocks of the frame stored in the memory 5 for generating a signal 4 to be further transmitted. Said signal is supplied to a coder 9, which may be a prior art coder that compresses the received image into a compact format (for instance MPEG4, Div X, JPEG, or JPEG2000). After the compression by the coder 9 the obtained file is stored, for instance, on a computer hard disc 10 or another storage medium readable with an image reproduction device. Alternatively, instead of being stored, the obtained file is forwarded from the coder 9 over a communications network to an image reproduction device.

In FIG. 1 the coder 9 is depicted by way of example as a separate part from the processor. Alternatively, another option is that the coder 9 is integrated with the processor, and consequently the processor and the coder can be implemented by one microcircuit, for instance.

Figure 2:
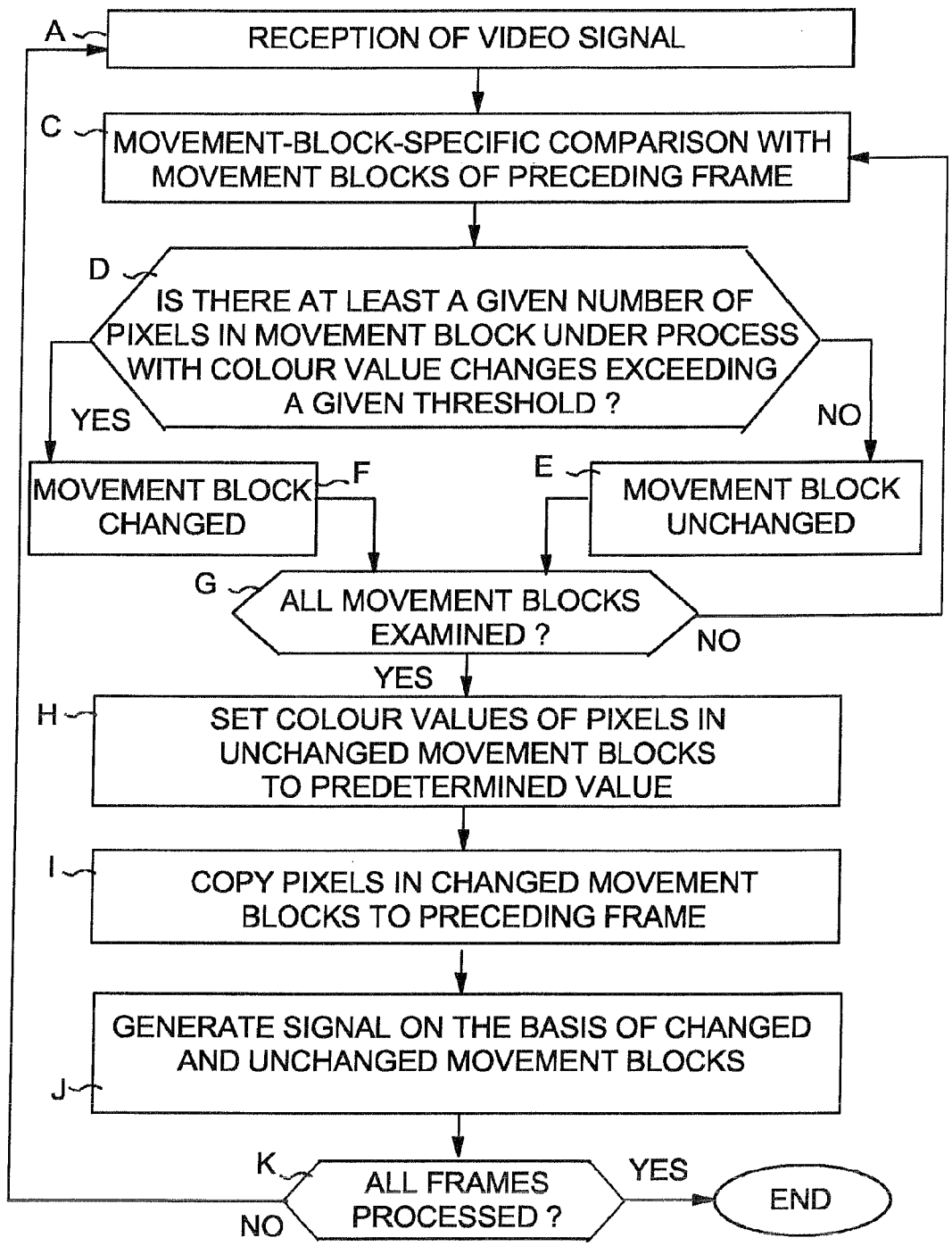
FIG. 2 is a flow chart of a processing method in accordance with the invention.

FIG. 2 is a flow chart of the processing method in accordance with the invention. FIG. 2 reveals in greater detail the operation of the processor in FIG. 1.

To initiate processing there are first performed preparatory operations. Raw image material or part of the raw image material to be captured from the camera is set unchanged in format, e.g., RGB, YUV, CMYK, B/W, Y. Movement blocks (MB) are defined to be rectangles having a width (MBW) and a height (MBH), i.e., both are preferably four pixels. MBW and/or MBH can also be 1 pixel. The size of the movement block (MBSIZE) is calculated by multiplying the width of the movement block (MBW) by its height (MBH), (MBW*MBH)=MBSIZE.

The width (FW) and the height (FH) of a frame (FRAME) are set to be divisible by the width (MBW) and the height (MBH) of the movement block (MB). The number of fixed movement blocks (MB) is calculated by multiplying the frame width (FW) by the frame height (FH) and the product is divided by the size of the movement block (MBSIZE), i.e. (((FH*FW)=FRAMESIZE/MBSIZE)=MBCOUNT.

A matrix (MBMATRIX) is created according to the number (MBCOUNT) of the movement blocks (MB) for instance such that a frame is divided into sections (4×4) starting from the upper left corner and ending at the lower right corner. For each (MBCOUNT) movement block (MB) in the frame there are calculated corner coordinates X and Y of the rectangle, P1, P2, P3, P4, which are placed in the matrix in accordance with the order number (MBINDEX) of the movement block. The corner coordinates of the movement block are disposed as follows: P1 is the upper left corner, P2 is the upper right corner, P3 is the lower right corner and P4 is the lower left corner.

There are created a frame buffer (FRAMEBUFFER) and a last frame buffer (LASTFRAMEBUFFER) that are equal in size. The size to be reserved for the buffers (FRAMEBUFFERSIZE, LASTFRAMEBUFFERSIZE) is calculated by multiplying the frame width (FW), the frame height (FH) and the colour depth (COLORDEPTH) in bytes or bits, i.e. (FH*FW*COLORDEPTH) =FRAMEBUFFERSIZE=LASTFRAMEBUFFERSIZE.

For pixel changes there is created a common colour sensitivity value (COLORSENSITIVITY), which defines the pixel change. The higher the value, the greater the colour change in the compared pixels must be in order for the current pixel to be found changed.

A common trigger value (MBTRIGGERVALUE) is created for the changes in the movement blocks, which value defines a change in the movement block. The higher the value, the larger the number of pixels which must change, in order for the current movement block to have changed.

A counter value of changed pixels (CHANGECOUNTER) is created, which value indicates the number of changed pixels in the current movement block.

A list (CHANGEDLIST) of changed movement blocks is created, which list indicates an index of the changed movement blocks.

After these preparatory operations, reception of a signal from a camera starts in block A. The image arriving from the camera or camera module is copied in the FRAMEBUFFER memory. The last frame buffer (LASTFRAMEBUFFER) memory is zeroed, if it has not been used before. To zero the memory denotes that the value of each byte is set to zero. The list of the changed movement blocks (CHANGEDLIST) is reset. The value of the colour sensitivity of the movement block (COLORSENSITIVITY) is set, for instance, to have a value within the range of 4096 to 8192. The value can be set to be more sensitive (e.g., 2048 to 4096) if the target of the image is in the dark, or correspondingly, higher (e.g. 8192 to 16384) if the target is better lit than normal. The value varies also based on the bit depth of the pixel values. The smaller the bit depth (COLORDEPTH) of the pixel value is, the smaller the COLORSENSITIVITY value is, and vice versa. For one colour component the COLORSENSITIVITY value can vary from 1 to 255, if 8 bits (=1 byte) are used for colour component value. A zero value means that there is no change in pixel value. The trigger value of a change in the movement blocks (MBTRIGGERVALUE) is set to be 4 to 8, for instance. The value can also be set lower (e.g. 1 to 4) if the target is more remote, or higher (e.g. 8 to 16) if there is a lot of noise or interference in the target. The value varies also based on the size of the block. The bigger the block is, the bigger the MBTRIGGERVALUE value is, and vice versa.

Block C starts movement-block-specific comparison with the corresponding movement blocks in the preceding frame. Operations of blocks D to G are performed on each movement block.

Block D finds out whether the current movement block includes at least a given number of pixels whose colour value change exceeds a predetermined threshold. This can be carried out in the following manner:

First the counter of changes in the movement block pixels (CHANGECOUNTER) is set to zero. A sub-loop is created where each (MBSIZE) pixel of the movement block (MB) to be processed (MBINDEX) is examined in accordance with the matrix (MBMATRIX) starting from the coordinates P1 through to the coordinates P4, however in rectangle-shape form not to go over the coordinates P2, nor to go under the coordinates P3. The following operations are performed on each pixel:

RGB values of pixels indicated by the coordinates are picked up from the frame under process (FRAMEBUFFER) and the preceding frame (LASTFRAMEBUFFER).

RG values (PIXELRG) of a pixel in the frame under process (FRAMEBUFFER) are compared with the RG values (LASTPIXELRG) of the pixel in the preceding frame (LASTFRAMEBUFFER) so as to obtain a change in the absolute value of colour components red (RED) and green (GREEN), i.e., an absolute (ABS) change (ABSRGDIFFERENCE). Counting is performed such that the difference between the RG values of pixels in the frame under process (FRAMEBUFFER) and the preceding frame (LASTFRAMEBUFFER) is placed in an ABS function, i.e. ABS(PIXELRG−LASTPIXELRG)=ABSRGDIFFERENCE. If the absolute change (ABSRGDIFFERENCE) in the colour components red (RED) and green (GREEN) is greater than the colour sensitivity (COLORSENSITIVITY) of the movement blocks, the value of the pixel change counter (CHANGECOUNTER) is raised by one.

If the change in pixels was not detected in the colour components red (RED) and green (GREEN), then the colour components of green (GREEN) and blue (BLUE) are compared in the same manner as described above for the RG values. The GB values (PIXELGB) of the pixel in the frame under process (FRAMEBUFFER) are in that case compared with the GB values (LASTPIXELGB) of the pixel in the preceding frame (LASTFRAMEBUFFER) so as to obtain an absolute (ABS) change (ABSGBDIFFERENCE) in the colour components green (GREEN) and blue (BLUE). Counting is performed such that the difference between the GB values of pixels in the frame under process (FRAMEBUFFER) and the preceding frame (LASTFRAMEBUFFER) are placed in an ABS function, i.e. ABS(PIXELGB−LASTPIXELGB)=ABSGBDIFFERENCE. If the absolute change (ABSGBDIFFERENCE) in the colour components green (GREEN) and blue (BLUE) is greater than the colour sensitivity (COLORSENSITIVITY) of the movement blocks, the value of the pixel change counter (CHANGECOUNTER) is raised by one. The previous RG and BG values are just examples and other colour values can be used when the change is detected and the selection of the used value also affects the COLORSENSITIVITY value.

When all pixels in the movement block have been examined in the above manner, the pixel change counter is checked. If the value of the pixel change counter (CHANGECOUNTER) is higher than the trigger value of a movement block change (MBTRIGGERVALUE), the movement block is detected as changed, whereby the process proceeds to block F, where a movement block index (MBINDEX) is set on a list of changed items (CHANGEDLIST). Whereas, if the value of the pixel change counter is lower than the trigger of the movement block change, the predetermined threshold was not exceeded, whereby the movement block is detected as and the process proceeds to block E.

In block G it is checked whether all the movement blocks of the frame to be processed have been examined. If not, the process returns to block C, from which the processing of the following movement block starts.

In block H the colour values of pixels in the movement blocks detected as unchanged are set to a predetermined value. In accordance with the invention it is advantageous to set the colour values to indicate the movement block pixels as being black, because experiments have shown that prior art compression algorithms of an image are then capable of processing these movement blocks quickly, and additionally, the file size of the produced compressed image is small. However, it is possible to set the colour values to correspond to another colour that enables achievement of corresponding advantages with the compression algorithm used. The colour values can also be selected based on the colours that are not available or common in the image. Information of the selected colour can be pre-defined for the reproduction device or the reproduction device can get the information e.g. from image processor.

The setting of colour values can be implemented, for instance, by creating a loop, in which all changed movement blocks (CHANGEDLIST) are examined. In the loop there are examined the movement blocks that do not appear on the list of changed items (CHANGEDLIST). Each pixel of these unchanged movement blocks is set as black in the frame buffer (FRAMEBUFFER).

In block I the pixels of the changed movement blocks are copied to the preceding frame in the corresponding movement blocks. This can be implemented by examining in the loop the movement blocks that appear on the list of changed items (CHANGEDLIST). Each pixel of these movement blocks is copied unchanged to the same location in the preceding frame buffer (LASTFRAMEBUFFER).

In block J a signal is generated on the basis of the information (FRAMEBUFFER) on the changed and unchanged movement blocks. The signal thus conveys a pre-processed image that can subsequently be compressed by means of a compression algorithm.

In block K it is monitored whether more data is arriving from the camera or another image source. In the affirmative, the process returns to block A, from which the processing of a new received frame starts.

Unlike in the flow chart of FIG. 2, after detecting a specific movement block changed, it is possible in connection with block F, to record the movement blocks (8 blocks) surrounding said changed movement block as changed as well, for instance, by adding them to the list of changed items (CHANGEDLIST). Experiments have shown that in some cases there may occur interference in a reproduced image in these surrounding movement blocks.

Figure 3:
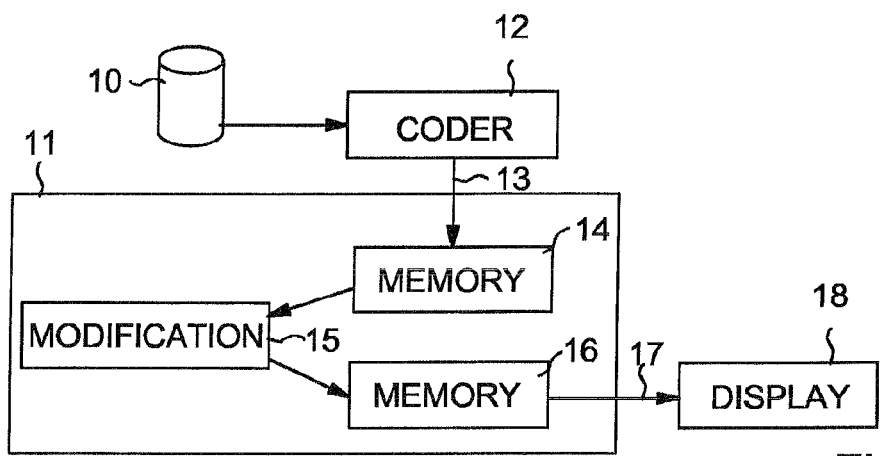
FIG. 3 is a block diagram of a reproduction device in accordance with the invention.

FIG. 3 is a block diagram of a first preferred embodiment of a reproduction device in accordance with the invention. Operations set forth in the blocks of the reproduction device 11 presented in the block diagram of FIG. 3 can be implemented by computer software, circuit solutions or combinations thereof. Operationally the blocks can be implemented in the presented manner, or alternatively, the operations of one or more blocks can be integrated. In practice, the reproduction device 11 may consist of a computer, a television peripheral, a mobile station or any other reproduction device which is capable of reproducing an image.

In the case of FIG. 3, it is assumed, by way of example, that compressed data is retrieved from a hard disk 10, after which a decoder 12 decodes compression (e.g. MPEG 4 or DivX) and supplies to the reproduction device 11 a signal 13 containing image information. The images contained in the signal 13 are stored in a memory 14, from which the reproduction device 11 retrieves and processes them one by one.

Modification block 15 identifies from the frame stored in the memory 14 the movement blocks comprising at least a given number of pixels whose colour values correspond with a given accuracy to those of a given colour. The modification block 15 identifies these movement blocks as unchanged movement blocks. The modification block 15 identifies all other blocks as changed movement blocks. The modification block 15 copies the pixels of the changed movement blocks from the frame in the memory 14 to the corresponding movement blocks of the preceding frame to be maintained in the memory 16. The reproduction device 11 utilizes the image produced in the memory 16 by including it in a signal 17 to be applied to a display 18.

FIG. 3 shows, by way of example, that the hard disk 10 (or another storage medium of a file), the decoder 12 and the display 18 are separate from the reproduction device 11. In practice, however, one or more of these parts can be integrated with the reproduction device. Moreover, it is an option that the data to be reproduced is not stored on a storage medium at all, but is received from a communications network from which it is supplied to the decoder 12.

Figure 4:
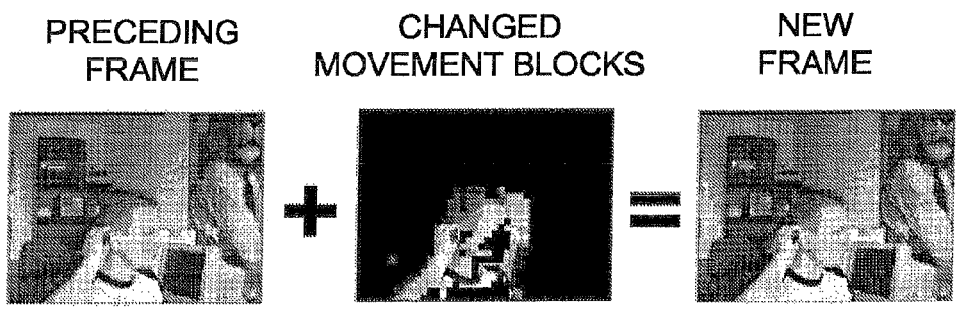
FIG. 4 illustrates production of an image with the reproduction device.

FIG. 4 illustrates production of an image with the reproduction device. On the left in FIG. 4 there is a previous, processed and reproduced frame. In the middle there is a frame under process, wherein unchanged movement blocks are black, and whereby only the changed movement blocks are in the original form. When the changed movement blocks of the middle frame are copied to the corresponding locations in the previous frame on the left, the result will be a new, changed frame shown on the right.

Figure 5:
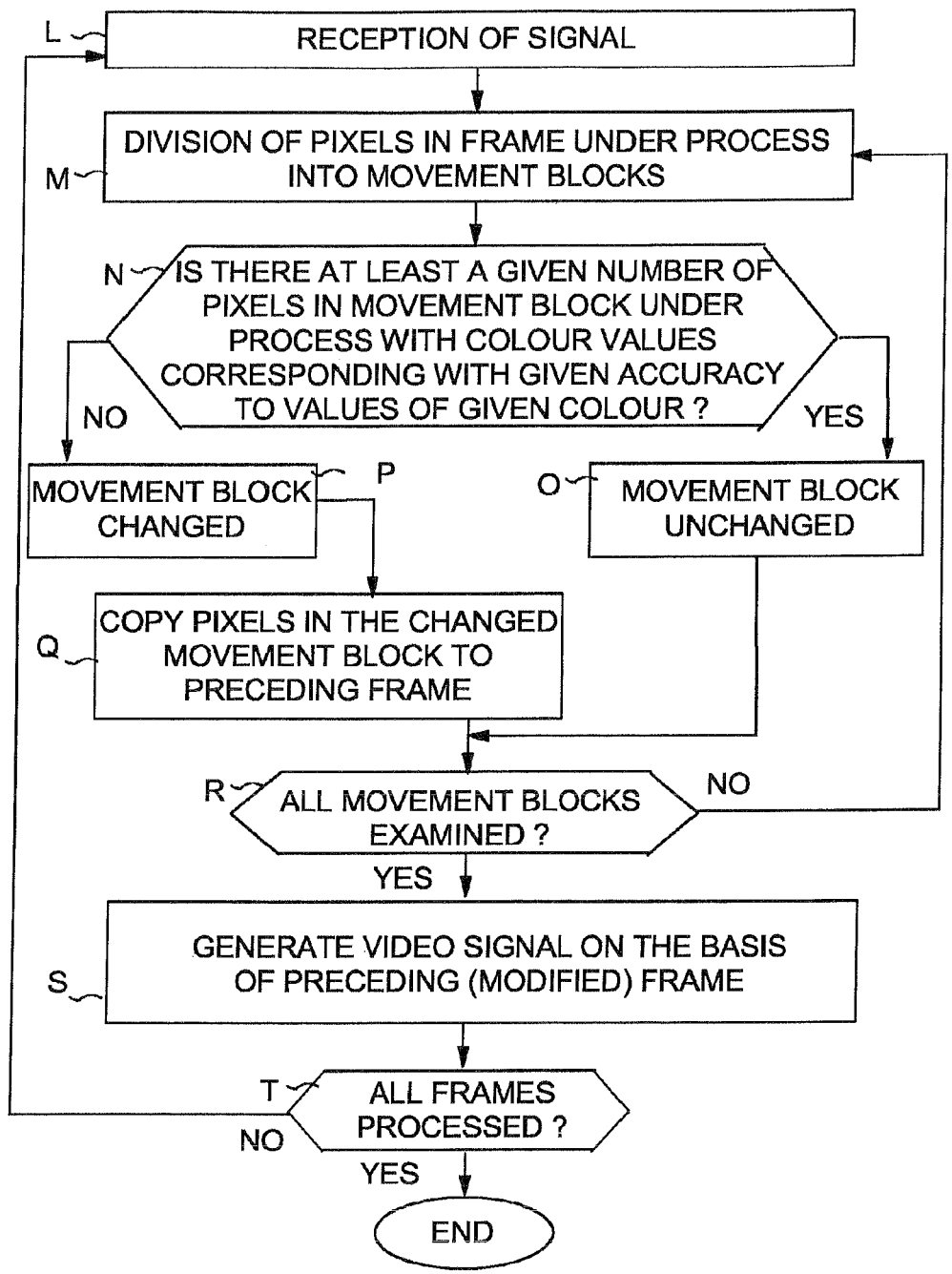
FIG. 5 is a flow chart of a reproduction method in accordance with the invention.

FIG. 5 is a flow chart of a first preferred embodiment of a reproduction method in accordance with the invention. At first, some preliminary operations are performed to reproduce an image.

A decoded image is received in, e.g., RGB format. The movement blocks are rectangles whose width (MBW) and height (MBH) are, i.e. both four pixels. MBW and/or MBH can also be one pixel. The size of a movement block (MBSIZE) is calculated by multiplying the width (MBW) of the movement block by its height (MBH), (MBW*MBH)=MBSIZE. The width (FW) and the height (FH) of a frame (FRAME) are set to be divisible by the width (MBW) and the height (MBH) of the movement block. The number of fixed movement blocks (MB) is calculated by multiplying the frame width (FW) by the frame height (FH) and the product is divided by the size of the movement block (MBSIZE), i.e. (((FH*FW)=FRAMESIZE/MBSIZE)=MBCOUNT.

A matrix (MBMATRIX) is created in accordance with the number (MBCOUNT) of the movement blocks (MB), for instance, such that a frame is divided in sections (4×4) starting from the upper left corner and ending at the lower right corner. For each (MBCOUNT) movement block (MB) in the frame there are calculated corner coordinates X and Y of the rectangle, P1, P2, P3, P4, which are placed in the matrix in accordance with the order number (MBINDEX) of the movement block. The corner coordinates of the movement block are disposed as follows: P1 is the upper left corner, P2 is the upper right corner, P3 is the lower right corner and P4 is the lower left corner.

There are created a frame buffer (FRAMEBUFFER) and a buffer of a frame to be interpreted (PREFRAMEBUFFER) that are equal in size. The size to be reserved for the buffers (FRAMEBUFFERSIZE, PREFRAMEBUFFERSIZE) is calculated by multiplying the frame width (FW), the frame height (FH) and the colour depth (COLORDEPTH) in bytes or bits, i.e. (FH*FW*COLORDEPTH) =FRAMEBUFFERSIZE=PREFRAMEBUFFERSIZE.

There is created a common trigger value (MBTRIGGER-VALUE) (for instance 4), which determines a change in the movement block. The higher the value, the more pixels need to change in order for the movement block to be considered changed. There is created a counter value of changed pixels (CHANGECOUNTER), which indicates the number of changed pixels in the movement block to be processed.

Reception of the signal containing image information starts in block L. The image information contained in the received signal is stored in a memory (PREFRAME-BUFFER). The memory (FRAMEBUFFER) of a completed frame to be reproduced is zeroed, if it has not yet been used. To zero the memory denotes that the value of each byte is set to zero.

In block M the pixels of the frame to be examined are divided into movement blocks. Thus, the pixels that belong to a subsequent movement block to be examined are searched one movement block at a time.

In blocks N to O all the movement blocks of the frame are examined one by one so as to find out whether in the movement block there are at least a given number of pixels whose colour values correspond with a given accuracy to those of a given colour. In the affirmative, an unchanged movement block is in question. Otherwise a changed movement block is in question. This can be implemented such, for instance, that the following operations are performed on each movement block:

The pixel change counter (CHANGECOUNTER) of a movement block is set to zero;

A sub-loop is created in which each (MBSIZE) pixel of the movement block (MB) to be processed (MBINDEX) is examined in accordance with the matrix (MBMATRIX), starting from the coordinates P1 through to the coordinates P4, however, in rectangle-shape form not to go over the coordinates P2, nor to go under the coordinates P3;

The pixel colour indicated by the coordinates is established from the interpreted frame (PREFRAMEBUFFER);

If the unchanged movement blocks are indicated by setting their colour values to correspond to those of black colour, then, if the value of the pixel colour (PIXELCOLOR) of the frame to be interpreted (PREFRAMEBUFFER) exceeds the black sensitivity (BLACKSENSITIVITY) value of the changing pixels (for instance 4096), the value of the pixel change counter (CHANGECOUNTER) is raised by one. (In other words, if the pixel colour is not black, the value of the pixel change counter is raised by one);

Whereas, if the unchanged movement blocks have been indicated by setting their colour values to correspond to those of another colour, then:

If the sum of pixel colour components red (RED) and green (GREEN) differs at most for a predetermined error margin from the sum of the colour components red (RED) and green (GREEN) of a given colour, the value of the pixel change counter (CHANGECOUNTER) will be raised by one.

If the error margin was not exceeded in the comparison of the red (RED) and the green (GREEN) colour components, the green (GREEN) and the blue (BLUE) colour components are also compared. If the sum of the pixel colour components green (GREEN) and blue (BLUE) of the interpreted frame differs at most for a given error margin from the sum of the green (GREEN) and the blue (BLUE) colour components of a given colour, the value of the pixel change counter (CHANGECOUNTER) will be raised by one.

When all the pixels have been examined, the value of the pixel change counter (CHANGECOUNTER) is checked. If the value exceeds the trigger value of the change in the movement block (MBTRIGGERVALUE), a changed movement block is in question, whereby the process proceeds via block P to block Q. Whereas, if the value is not higher than the change trigger value, the process proceeds via block O to block R.

In block Q the pixels of the changed movement blocks are copied to the preceding frame. This can be done by copying each pixel of the movement block under process unchanged to the same location in the frame buffer (FRAMEBUFFER).

From block R the process returns to block M to process a subsequent movement block if there are still unexamined movement blocks in the frame under process.

In block S a signal is generated on the basis of the modified frame (FRAMEBUFFER).

If the signal reception goes on, the signal containing more frames to be interpreted, the process returns from block T to block L so as to process the image information of a subsequent frame received.

When the above-described method is used, the standard or currently implemented image or video compression methods (codecs) can be used without modification. New methods can be used to improve image compression efficiency or image quality when the used codec solution can also be modified.

With non-modified codecs it is sometimes also difficult to indicate unchanged movement blocks by colour values when the used colour is also in the image in the changed area or the changed image area contains almost all colours so that it is difficult to change to a colour value suitable for the unchanged detection.

When the codec being used is modified, the information of unchanged movement blocks can be delivered differently rather than changing the pixel colour values of the movement block to the predefined colour value. For example, information can be separately delivered from the image processor to the video encoder and decoder as well as to the reproduction device. When the encoder or decoder knows that some block is unchanged, it does not need to compress or decompress that block at all and so the compression efficiency can be improved. In addition, the processing requirements of the encoder and decoder are reduced. As a result, the reproduction device then modifies only the decoded pixels and does not touch the unchanged blocks at all, but keeps the information the same as it was in the previous image frame.

When a situation arises wherein the same colour is available in the changed movement block as that used as an indicator colour for the unchanged movement block, then there are multiple solutions available to solve the conflict.

A first solution changes the indicator colour to the colour that is not available in the changed areas and delivers this changed colour to the reproduction device. If the delivery is not possible or if there is no suitable colour available, then other solutions are needed.

A second solution detects if there is the indicator colour used in the changed blocks and slightly modifies those pixel values in the changed blocks so that the image quality is not damaged. However, the values used in the changed movement block are not detected as the unchanged block in the reproduction device. This means that all of the colour values are modified or at least some of the colour values are modified inside the movement block. It is also possible that other pixel and colour values, other than those originally used as the colour indicator, inside the movement block are modified, if that makes detection more robust or it improves the image quality.

It is also possible to modify unchanged movement block colour pixels and send some other information within the unchanged movement block, as long as the detection of movement block is still unchanged and it does not require too much additional bandwidth in the codec. In that way, some additional information improving coding efficiency or image quality can be delivered without any changes to the normal operation of the image processor and the image reproduction device.

A third solution uses a modified image/video codec that enables the indication of an unchanged movement block by signals other than the indication colour in the image. This information can be delivered by using one bit for every movement block to indicate whether the movement block is changed or remains unchanged. This information can also be compressed by using different coding methods, for example, run length coding. This information has to be used in the encoder and in the decoder. This information also needs to be delivered to the decoder before the image information of the movement block tries to decode.

The third solution is different than that described in WO 86/03922, because the publication requires that the addresses of the respective areas be sent. The publication also requires sending a code word to pick up the information from respective areas from the reference memory or otherwise the new picture information is sent. The solution always uses one and only one bit to indicate the status of the movement block (changed/unchanged in known movement block position) and if the status is changed, then additionally the information of the changed block is sent by the encoder and received by the decoder. The method of the present invention is able to encode and decode this one bit per movement block information separately from the other information. This information does not contain any address changes or motion vector information, but only the information that the movement block is changed or unchanged.

The method taught in the WO publication is also designed mainly for storing background image information in the reference memory and due to that the reference memory can also contain information from multiple frames. In the present method the previous image or one selected image (Note: there can be multiple frames in the memory and one of them is selected to be as LASTFRAMEBUFFER) is always used and the present method is therefore more suitable for all image areas (not only for background areas). Note: the movement block can be unchanged inside the moving object or it can be a different object in different images, whereas the image information inside the movement block is similar enough in the current and reference image.

It is also possible that the detection of the movement block being changed or unchanged is made based on some of the colour components and some of the colour components are still coded differently. For example, if Y and U colour channels are detected as unchanged and their values are set as an indication colour, but B channel is still coded as a changed movement block, this issue has to be taken into account in both the image processor and the reproduction device.

It is also possible that the indication of the movement block being unchanged is made based on some colour components in the reproduction device, but still all colour components or some other colour components are processed as unchanged movement areas. This means that the image information is copied to unchanged colour components from the reference memory and the new image information of that colour might be used for other colour components or for some other purposes. This issue has to be taken into account in both the image processor and the reproduction device. It is also possible that the indication of the movement block being changed is made based on some colour components in the reproduction device, but still all colour components or some colour components are processed as changed movement areas. This enables e.g. delivery and reception of the indication colour as changed movement block.

It is also possible that the detection of changed/unchanged is made differently in the image processor than using CHANGECOUNTER and MBTRIGGERVALUE. It can be based on, for example, sum/mean of differences, sum/mean of absolute differences, variance/standard deviation of differences, variance/standard deviation of absolute differences, or any other detection method. The image processor still indicates the movement block to be unchanged by using an indication colour in the image or the image processor delivers the changed/unchanged status by any other means that can be used in the image/video reproduction device (and also in encoder and in decoder).

It is also possible that the threshold of changed/unchanged block detection in the image processor varies block by block. The reproduction device (and e.g. encoder and decoder) will get the information based on the indication colour or other mean, but the image processor can arrive at a decision based on the current and previous frames (e.g., if the mean of the absolute differences is used as a changed/unchanged detection method, then the variance of the pixels in the reference frame and/or in the current frame can change the threshold). The bigger the variance of the movement block pixels, the bigger the threshold for changed/unchanged detection. Also noise level in the image can change the threshold. The bigger the noise level, the bigger the threshold. The noise level can be calculated also from the previous frame as well as from the current frame. It is also possible that the mean of the block variances can be used as a noise level detector. It is also possible that only some blocks (e.g., 10%) are used for noise detection; that is, the blocks that have the smallest variances. Also, many other noise detection methods can be used, and the mean of the pixel values can change the threshold. There might not always be any linear change of the threshold and the other parameters available, but the change can be also non-linear.

It is possible that the detection of the changed/unchanged movement block is done differently in the reproduction device. The detection can be based on the number of pixels that have the indication colour value. The detection can also be, for example, the mean of the pixel values in the movement block. It can also be the mean and variance of the pixel values in movement block. As mentioned earlier, it is also possible that the pixel values are not used at all (pixels might not be even delivered/received), but the information is delivered/received by another mean.

It is also possible to use movement blocks that are different in size in different parts of the image and then MBCOUNT is also calculated differently. In this case, the image processor and the image reproduction device have to know what sizes the movement blocks are in the different parts of the image. This information can be pre-defined or sent by the image processor and received by the reproduction device using many different methods. In practice this kind of method requires a modified image encoder and decoder that can understand the used block sizes and optimize functionalities based on them.

Standard and most probably also future video codecs can efficiently detect and encode zero motion vectors when the block in the current and in the reference frame is same or very similar. For that reason it is also possible that the pixel values in the block that is detected to be unchanged can be copied from the reference frame and that can be used as "indication colour" to the encoder. This method enables faster and more efficient video encoding, but still improves the coding result e.g. in noisy imaging environment and in case when the block is not wanted to be modified. When this kind of indication method is used then the reproduction device just uses decoder output and modifies reference image based on those pixel values as all the blocks would be changed movement blocks. Reproduction device can also detect all the zero motion blocs without any prediction error coding to be as unchanged movement blocks and then it can simplify its operations and does not need to do any unnecessary block copies to the reference frame when the block is not actually changed.

It is also possible that the image or block has processed with different colour or pixel formats (e.g., Y, YUV420, YUV422, YUV444, RGB444, G). The format can also be planar, interleaved, line planar etc. It is also possible that during the processing the format is changed; that is, the original image is in interleaved RGB format and when it comes out from the image processor the format is planar YUV420. The size of the movement block for different colour channels can be the same or different, and also the amount of movement blocks in the different colour channels can be different. Colour and pixel format changes can be done in the image processor as well as in the reproduction device.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims.

The invention claimed is:
1. An image processor which is configured:
   to receive a signal,
   to compare an individual frame under process, included in the received signal, with a preceding processed frame,
   to detect changes by dividing pixels of the individual frame into movement blocks of a predetermined size and to detect a given movement block as changed if in said movement block there are at least one pixel whose characteristic value has changed as compared with a corresponding pixel of the preceding processed frame by a predetermined threshold,
   to provide an indication of the movement blocks that are unchanged as compared with the preceding processed frame, and
   to generate a signal which indicates the changes by including in said signal the information on movement blocks detected as changed and information on movement blocks detected as unchanged such that said signal includes all the movement blocks of the frame under process, wherein the image processor is configured
   to provide indication of the movement blocks that are unchanged by copying the pixel values in the movement blocks that are detected to be unchanged from the preceding processed frame.

2. The image processor of claim 1, wherein the image processor is configured to divide only a portion of the pixels of an individual frame into movement blocks.

3. The image processor of claim 1, wherein a given movement block is detected as changed if there is at least a given number of pixels whose characteristic value change exceeds a predetermined threshold.

4. The image processor of claim 1, wherein the characteristic value is a colour value corresponding to one of RGB, YUV, CMYK, B/W and Y.

5. The image processor of claim 1, wherein the characteristic value is one of a colour value or a signal other than the colour value.

6. The image processor according to claim 1, wherein the detection of whether the movement block is changed or unchanged is based upon at least one of sum/mean differences, sum/mean absolute differences, variance/standard deviation of differences, and variance/standard deviation of absolute differences.

7. The image processor according to claim 1, wherein if the processor detects a given movement block as changed on the basis of a characteristic value check of pixels in the movement block, the processor is configured to record also all the movement blocks surrounding the given movement block as having changed.

8. The image processor according to claim 1, wherein the processor is configured to analyze a change in characteristic values such that if the absolute value of a change in a first characteristic value of a single pixel exceeds said predetermined threshold, the processor finds the characteristic values of said pixel changed.

9. The image processor according to claim 1, wherein the processor is configured to modify said preceding processed frame by copying to it, from the frame under process, the pixels of the movement block detected as changed and to use said frame changed in this manner also in the comparison which the processor will perform on a frame subsequent to the frame under process.

10. The image processor according to claim 1, wherein the processor is configured to feed the generated signal to an image coder operatively coupled to the processor.

11. The image processor according to claim 1, wherein the received signal is a video signal generated by at least one of a camera, video camera, scanner, screen, file or other image source.

12. A method for processing a signal, the method comprising:
receiving a signal,
comparing a single frame included in the signal and being processed with a preceding processed frame,
detecting changes by dividing pixels in the single frame into movement blocks of a predetermined size and by detecting a given movement block as changed, if the number of pixels whose characteristic value changes as compared with the corresponding pixels in the preceding processed frame exceeds a predetermined threshold,
providing an indication of the movement blocks that are unchanged, as compared with the preceding processed frame, and
generating a signal that indicates the changes by including in the signal the information on the movement blocks detected as changed as well as the information regarding the unchanged movement blocks, such that said signal includes all the movement blocks of the frame under process, wherein in said method an indication of the movement blocks that are unchanged is provided by copying the pixel values in the movement blocks that are detected to be unchanged from the preceding processed frame.

13. The method of claim 12, wherein the movement block is a rectangle.

14. The method according to claim 12, wherein the method analyzes changes in characteristic values by analyzing changes in colour values and the colour values of a single pixel are detected as changed if the absolute value of a first colour value of the pixel exceeds said predetermined threshold.

15. The method according to claim 12, wherein the colour values correspond to at least one of RGB, YUV, CMYK, B/W and Y values.

16. The method according to claim 12, wherein the method modifies said preceding processed frame by copying to it from the frame under process the pixels of the changed movement blocks and uses the preceding processed frame modified in this manner for the comparison to be performed on a frame subsequent to the frame under process.

17. Software for controlling a programmable device for implementing the method according to claim 12.

\* \* \* \* \*